Figure 1:

United States Patent Office 3,202,552
Patented Aug. 24, 1965

3,202,552
COMBINED HEAT TREATMENT AND LEACHING OPERATIONS FOR THE PRODUCTION OF HOLLOW ARTICLES
John Thexton, Malvern, England, assignor to The International Nickel Company, Inc., New York, N.Y., a corporation of Delaware
Filed June 12, 1962, Ser. No. 201,993
Claims priority, application Great Britain, June 30, 1961, 23,791/61
2 Claims. (Cl. 148—13)

The present invention relates to leaching and, more particularly, to the acid leaching of filler bodies from hot worked heat-resistant metal.

It is well known that one method of producing metal articles with holes in them comprises making one or more holes in a billet or the like, inserting a filler in each hole, shaping the billet or the like by extrusion or otherwise, the filler being simultaneously distorted, and finally removing the filler. Usually the filler and, therefore, the hole containing it, is considerably elongated and reduced in cross-sectional area during the shaping step. This method can be applied to the production of turbine blades from heat-resisting and creep-resisting alloys such as nickel-chromium or nickel-chromium-cobalt creep-resisting alloys, a billet of the alloy being drilled to form circular holes in which circular filler rods are inserted; thereafter the billet is converted to aerofoil shape and the filler is removed to leave very narrow cooling passages of elliptical or pseudo-elliptical section in the blade.

The usual method of removing the filler is to leach it out of the holes by an acid solution which exclusively attacks the filler, or at least attacks the filler preferentially to the main alloy. Usually the acid solution is 12.5% nitric acid heated to boiling point.

In the application of this leaching process to blades made of nickel-chromium-cobalt alloys of comparatively low chromium content substantial disadvantage has been found in that there is considerable intergranular corrosion especially at the corners of the fine pseudo-elliptical holes. It is necessary to reject many blades and this is a serious matter for the leaching occurs as nearly the last step when much labor has been put into the blade manufacture. Reduction in the strength of the nitric acid to 5% is no remedy. Although attempts were made to overcome the foregoing difficulties and other disadvantages none, as far as I am aware, was entirely successful when carried into practice commercially on an industrial scale.

It has now been discovered that by means of a special combination of heat treating and leaching operations, ferrous metal fillers can be successfully leached from hot worked masses of nickel-chromium-cobalt alloys having comparatively low chromium content.

It is an object of the present invention to provide a novel process of leaching ferrous metal filler from hot worked heat-resistant metal objects.

Another object of the invention is to provide a novel process of producing hollow fluid-coolable turbine blades by hot working filled heat-resistant metal and leaching the filler therefrom.

Figure 2:
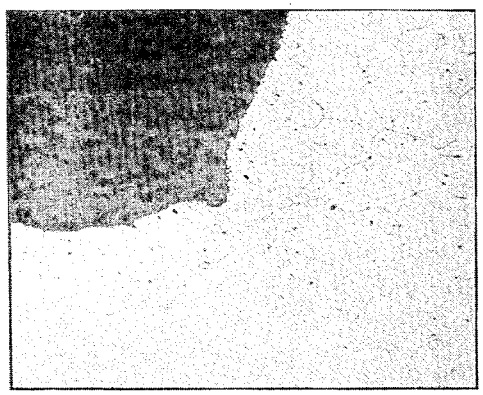

Other objects and advantages will become apparent from the following description taken in conjunction with the accompanying drawing in which:

FIGURE 1 is a photographic reproduction of a photomicrograph showing intergranular corrosion of a heat-resistant metal turbine blade adjacent a leached passage therein when processed not in accordance with the present invention; and FIGURE 2 depicts a photographic reproduction of a photomicrograph showing the absence of intergranular corrosion in a heat-resistant metal turbine blade adjacent a leached passage when said turbine blade is processed in accordance with the present invention.

Generally speaking, the present invention contemplates a novel process of leaching ferrous metal filler from a hot worked heat-resistant metal article or object which process includes subjecting the article to heat treatment before the leaching. This heat treatment comprises heating the article to a temperature in the range of about 1040° C. to about 1080° C. for long enough to enable carbide phases to agglomerate as relatively stable, discrete particles along the grain boundaries. Only a short time, say, about 0.5 hour, is necessary for this purpose and since prolonged heating is uneconomical, the articles are not heated for more than about four hours. It has been found that 0.5 hour at 1050° C. is satisfactory. The articles are air cooled after the heating.

The heat treatment used according to the invention does not impair the final properties displayed by a blade subjected subsequently to a final heat treatment consisting in heating for 4 hours at 1150° C., then for 16 hours at 1050° C. and lastly for 16 hours at 850° C., with air cooling after each heating.

The invention is particularly applicable to blades and other articles of alloys containing in weight percent about 13.5% to about 15.75% chromium, about 10% to about 55% cobalt, about 4% to about 9.5% aluminum, about 0.5% to about 2% titanium (the total of aluminum and titanium not exceeding about 10.5%), about 0.05% to about 0.5% carbon, boron up to about 0.02% and zirconium up to about 0.5%, with or without molybdenum up to about 10%, iron up to about 10%, tungsten up to about 5%, manganese up to about 1%, silicon up to about 2.5%, niobium up to about 2%, tantalum up to about 2% and beryllium up to about 3%, the balance being nickel.

As an example of the process of the present invention, two filled turbine blade structures were produced by hot working and twisting. The ferrous metal filler in the first structure was leached in boiling 10% commercial nitric acid for 100 hours. The second structure was heated for 0.5 hour at 1050° C., then air cooled to room temperature prior to being leached in the same manner as the first. Both structures were made of an alloy containing about 13.5% to about 15.75% chromium, about 18% to about 22% cobalt, about 4.5% to about 5.5% molybdenum, about 0.9% to about 1.5% titanium, about 4.2% to about 4.8% aluminum, up to about 0.2% carbon, up to about 1% silicon, up to about 1% iron, up to about 1% manganese, small but effective amounts of boron and zirconium, with the balance being essentially nickel, and were solution treated at 1150° C. for 4 hours, air cooled and aged at 1050° C. for 16 hours then air cooled. After treatment, the first turbine blade structure exhibited intergranular corrosion adjacent the leached passages as shown in FIGURE 1 of the drawing wherein the dark area is the leached passage and the white area is the heat-resistant metal. The second turbine blade structure leached in accordance with the present invention exhibited no intergranular corrosion as shown in FIG. 2 of the drawing.

With regard to the process of the present invention, it is advantageous to limit leaching times to a maximum of about 100 hours when the leaching acid concentration is about 5% to about 10% by volume. When higher concentrations of nitric acid are employed for leaching, the leaching time should be somewhat reduced. In order to insure that relatively short leaching times will be employed, it is advantageous to employ a ferrous filler such as a ferritic iron-manganese-titanium filler as disclosed in the Betteridge U.S. Patent No. 2,891,307 and/or mild steel together with one or more cores of corrosion-resistant metal in said filler such as disclosed in the Horne et al.

U.S. Patent application Serial No. 657,453, now U. S. Patent No. 3,061,481. This combination of ferrous filler together with one or more cores accelerates the leaching so that even in minute passages of the order of 0.0003 square inch cross-sectional area, ferrous filler can be leached by 5% aqueous nitric acid in less time than about 100 hours.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process of leaching cored ferrous metal filler from filled passages in a hot worked metal object made of an alloy containing by weight about 13.5% to about 15.75% chromium, about 10% to about 55% cobalt, about 4% to about 9.5% aluminum, about 0.5% to about 2% titanium with the total of said aluminum plus said titanium not exceeding about 10.5%, about 0.05% to about 0.5% carbon, up to about 10% molybdenum, up to about 10% iron, up to about 0.02% boron, up to about 0.5% zirconium, up to about 5% tungsten, up to about 1% manganese, up to about 2.5% silicon, up to about 2% niobium, up to about 2% tantalum and up to about 3% berryllium with the balance being essentially nickel, comprising causing carbide phases in the microstructure of said alloy to agglomerate in the grain boundaries thereof by heating said filled hot worked metal object at a temperature of about 1040° C. to about 1080° C. for about 0.5 to about 4 hours, air cooling said filled hot worked metal object to room temperature and thereafter removing the ferrous metal filler therefrom by leaching in a hot, aqueous solution of nitric acid for up to about 100 hours.

2. A process as set forth and defined in claim 1 wherein the hot worked metal object is a turbine blade structure, the alloy contains by weight about 13.5% to about 15.75% chromium, about 18% to about 22% cobalt, about 4.5% to about 5.5% molybdenum, about 0.9% to about 1.5% titanium, about 4.2% to about 4.8% aluminum, up to about 0.2% carbon, up to about 1% silicon, up to about 1% iron and up to about 1% manganese with the balance being essentially nickel, and the leaching solution contains about 5% to about 12.5% by volume of nitric acid.

References Cited by the Examiner

UNITED STATES PATENTS

| | | | |
|---|---|---|---|
| 2,074,007 | 3/37 | Wissler | 29—423 XR |
| 2,499,977 | 3/50 | Scott | 29—423 XR |
| 2,977,222 | 3/61 | Beiber | 75—171 |
| 3,047,381 | 7/62 | Hanink et al. | 75—171 |

OTHER REFERENCES

Corrosion Handbook, Uhlig, John Wiley and Sons, Inc., New York, 1948, p. 163.

ASM Metals Handbook, vol. 1, 8th edition, 1961, pp. 115–116 and 565.

DAVID L. RECK, *Primary Examiner.*